(12) United States Patent
Lim et al.

(10) Patent No.: US 8,259,645 B2
(45) Date of Patent: Sep. 4, 2012

(54) METHOD OF OPERATING RANDOM ACCESS CHANNEL IN MOBILE COMMUNICATION SYSTEM

(75) Inventors: Kwang-Jae Lim, Daejeon (KR);
Sung-Kyung Kim, Daejeon (KR);
Chul-Sik Yoon, Seoul (KR); Jee-Hwan Ahn, Daejeon (KR)

(73) Assignee: Electronics and Telecommunications Research Institite, Daejeon (KR)

( * ) Notice: Subject to any disclaimer, the term of this patent is extended or adjusted under 35 U.S.C. 154(b) by 831 days.

(21) Appl. No.: 12/443,276

(22) PCT Filed: Apr. 3, 2007

(86) PCT No.: PCT/KR2007/001616
§ 371 (c)(1),
(2), (4) Date: Mar. 27, 2009

(87) PCT Pub. No.: WO2008/038872
PCT Pub. Date: Apr. 3, 2008

(65) Prior Publication Data
US 2010/0009688 A1    Jan. 14, 2010

(30) Foreign Application Priority Data
Sep. 29, 2006    (KR) .................. 10-2006-0095518

(51) Int. Cl.
*H04B 7/212* (2006.01)
(52) U.S. Cl. ........................................ 370/321
(58) Field of Classification Search .................. None
See application file for complete search history.

(56) References Cited

U.S. PATENT DOCUMENTS

| | | | | |
|---|---|---|---|---|
| 6,477,354 B1 * | 11/2002 | Roberts et al. | ................. | 455/7 |
| 7,069,577 B2 * | 6/2006 | Geile et al. | ................. | 725/106 |
| 2002/0089957 A1 | 7/2002 | Viero | | |
| 2004/0246891 A1 * | 12/2004 | Kay et al. | ................. | 370/215 |

(Continued)

FOREIGN PATENT DOCUMENTS

DE    199 50 858 A1    5/2001
(Continued)

OTHER PUBLICATIONS

International Search Report mailed on Jun. 9, 2009 and issued in corresponding International Patent Application PCT/KR 2007/001616.

*Primary Examiner* — Raj Jain
(74) *Attorney, Agent, or Firm* — Staas & Halsey LLP

(57) ABSTRACT

A random access channel operating method in a mobile communication system is provided. The random access channel operating method includes: (a) selecting a transmission mode according to a load of random access channel and performing transmission to a mobile terminal; (b) receiving a message having a format corresponding to the selected transmission mode from the mobile terminal; (c) determining whether or not a preamble or data is included in the message received in (b) receiving of the message; and (d) if the data is determined to be included in the (c) determining, transmitting a response message for data reception to the mobile terminal. Accordingly, use efficiency of a random access channel can be increased by measuring a system load of the random access channel in a base station and changing a transmission format of a burst transmitted through the random access channel according to the measured load level.

14 Claims, 8 Drawing Sheets

U.S. PATENT DOCUMENTS

2005/0232158 A1 10/2005 Hondo
2007/0064656 A1 3/2007 Lv et al.

FOREIGN PATENT DOCUMENTS

| | | |
|---|---|---|
| JP | 2003-333661 | 11/2003 |
| KR | 2000-0048229 | 7/2000 |
| KR | 2000-0055403 | 9/2000 |
| KR | 2002-0008196 | 1/2002 |
| KR | 10-2005-0060458 | 6/2005 |
| WO | 00/74416 A1 | 12/2000 |
| WO | WO2004/038951 | 5/2004 |
| WO | WO2005/022809 | 3/2005 |

* cited by examiner

[Fig. 1]
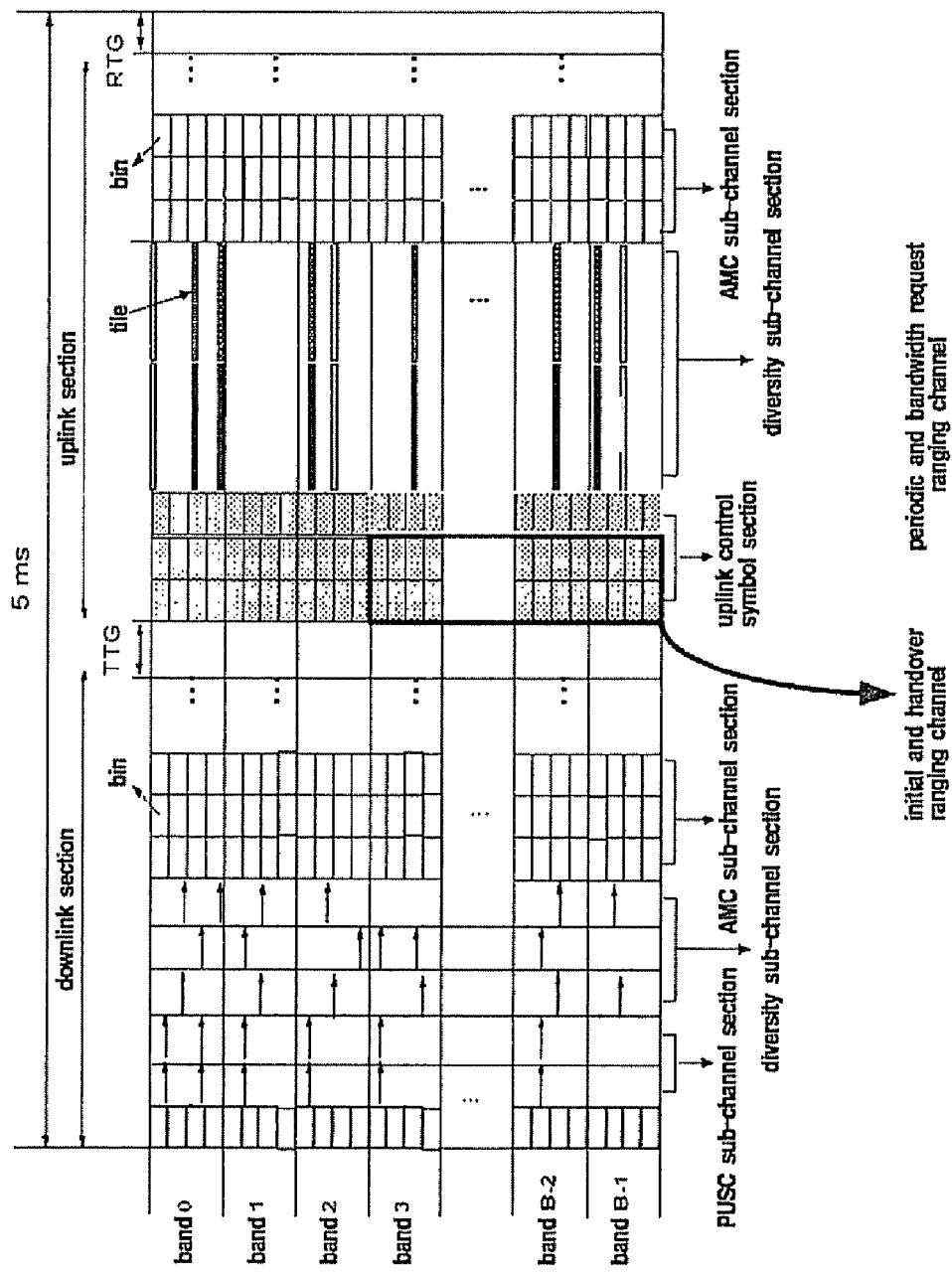

[Fig. 2]
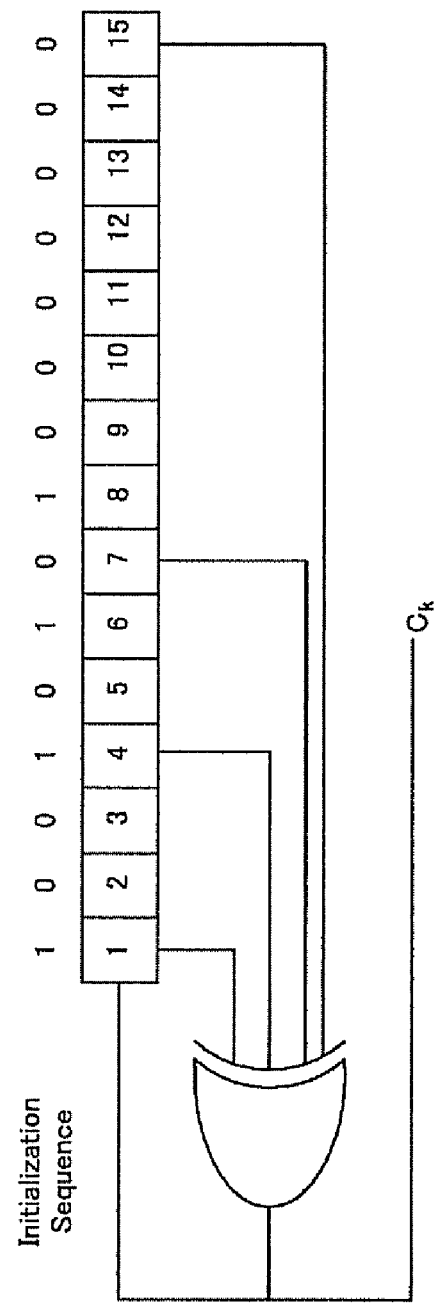

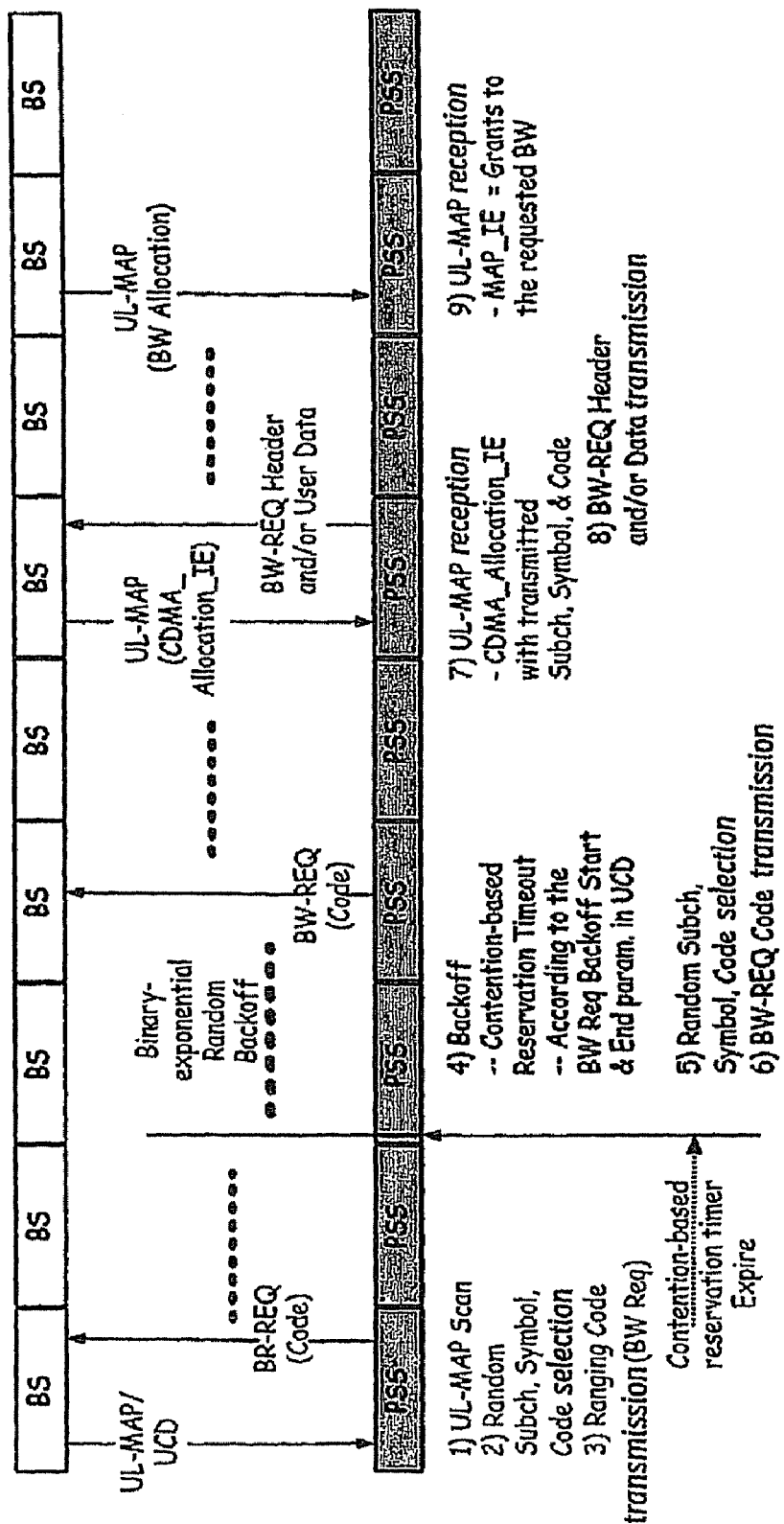
[Fig. 3]

[Fig. 4]
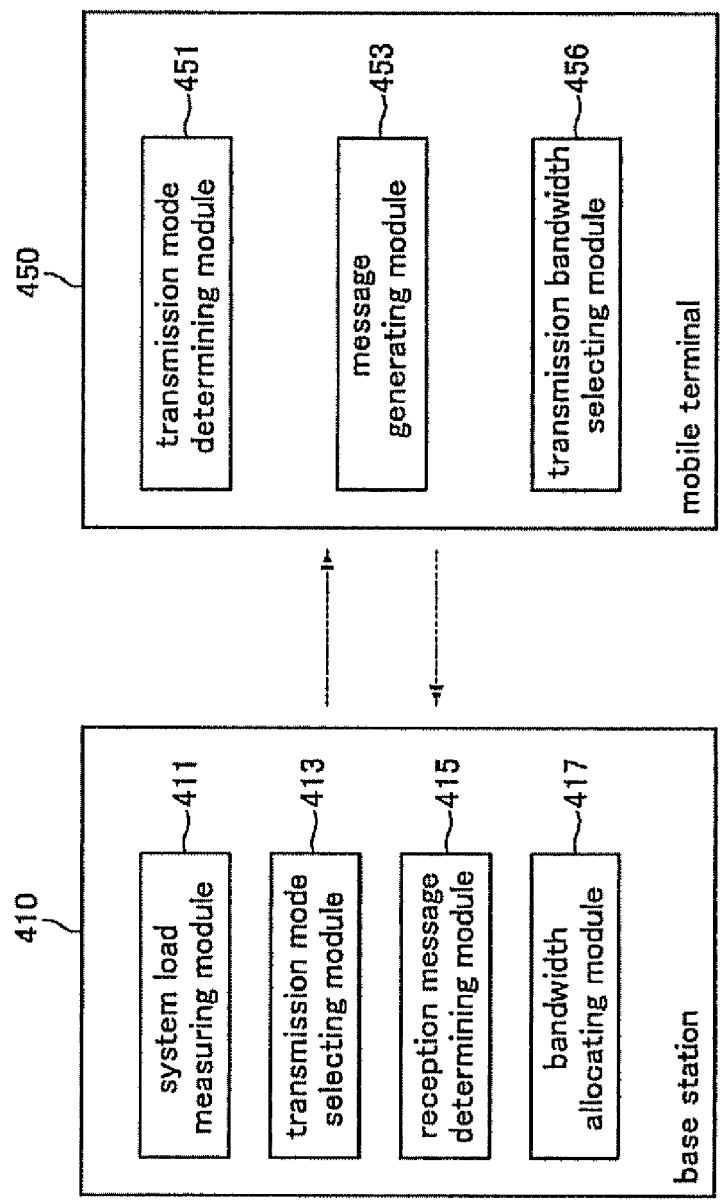

[Fig. 5]
TFI = '00' 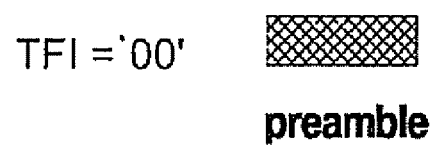
preamble
(a) High load
TFI = '01'  preamble+data
TFI = '10'  data+preamble
(b) Medium load
TFI = '11' 
(c) Low load

[Fig. 6]

[Fig. 7]
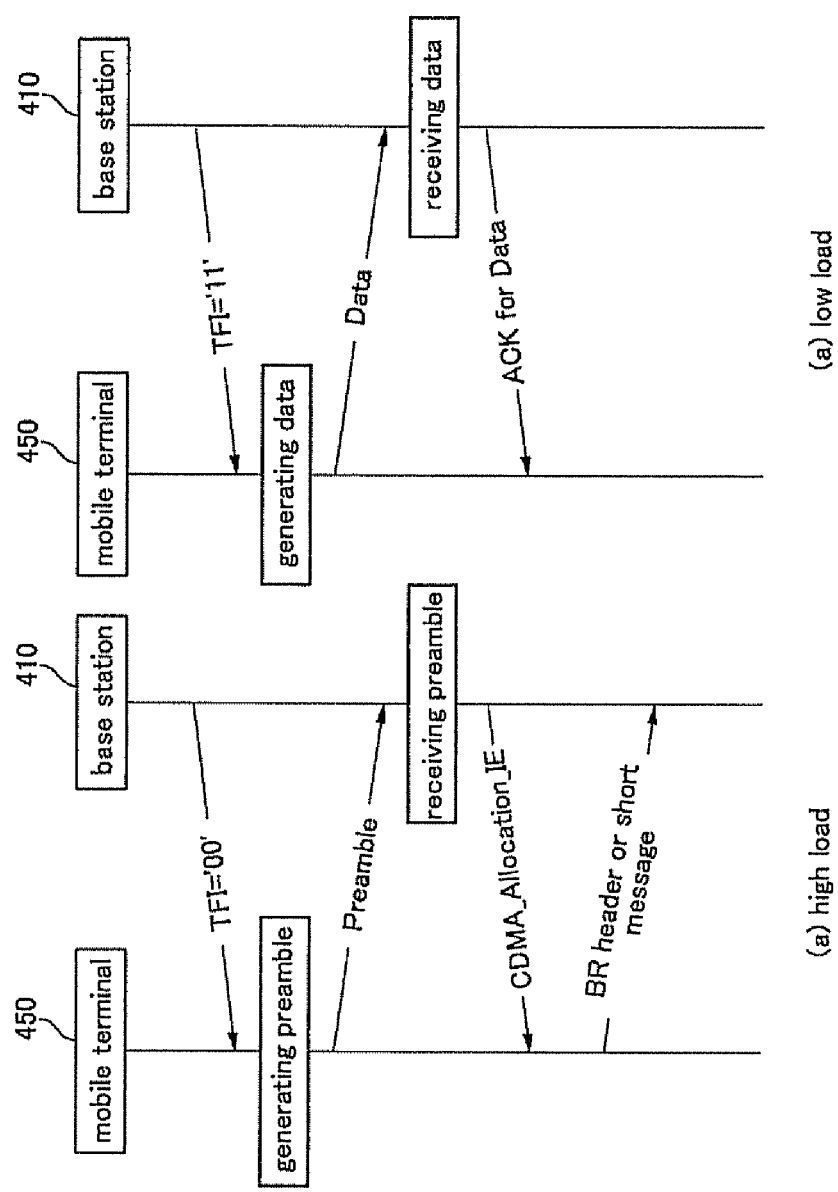

[Fig. 8]
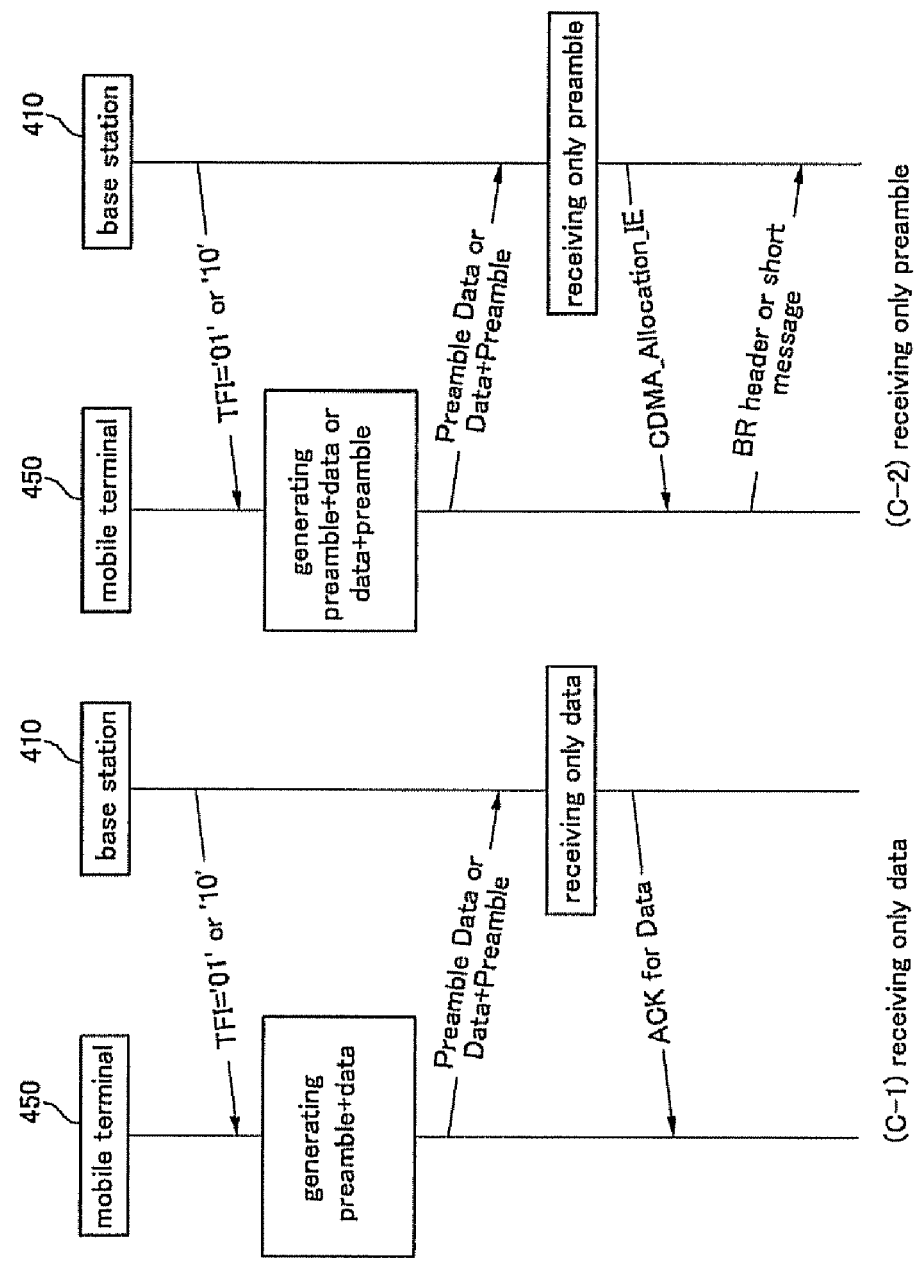

METHOD OF OPERATING RANDOM ACCESS CHANNEL IN MOBILE COMMUNICATION SYSTEM

CROSS REFERENCE TO RELATED APPLICATION

This application claims the priority of International Application No. PCT/KR2007/001616, filed Apr. 3, 2007, and claims the benefit thereof. The International Application claims the benefit of Korean Application No. 10-2006-0095518, filed on Sep. 29, 2006, both applications are incorporated by reference herein in their entirety.

TECHNICAL FIELD

The present invention relates to a method of operating a random access channel in a mobile communication system, and more particularly, to a method of operating a random access channel in a mobile communication system that is capable of changing a transmission format of a message that is transmitted through the random access channel according to a system load of the random access channel measured by a base station.

BACKGROUND ART

A random access channel in a mobile communication system is used for an initial code ranging operation in which a mobile terminal tries to initially access the mobile communication system, a handover code ranging operation in which the mobile terminal moving between base stations enters a target cell, a periodic code ranging operation in which uplink synchronization is periodically adjusted in an orthogonal frequency division multiple random access (OFDMA) mobile wireless access system, and a bandwidth request (BR) code ranging operation of requesting bandwidth allocation.

FIG. 1 is a view illustrating a frame structure used in a mobile communication system, and FIG. 2 is a schematic view illustrating a PN code generator used in the mobile communication system.

Referring to FIG. 1, in the mobile communication system, first three symbols of the uplink frame are used as the random access channels. Among the three symbols, the first two symbols are used as the initial code ranging channel and the handover code ranging channel, and the third symbol is used as the periodic code ranging channel and the bandwidth request ranging channel.

These ranging channels are commonly used by all mobile terminals. In the random access process, transmission is attempted through the ranging channels. In addition, according to ranging purposes, an orthogonal code set is divided and used. The transmission format is equal to a format of a 144-bit orthogonal code symbol generated by the PN code generator shown in FIG. 2.

FIG. 3 illustrates a signaling procedure including the bandwidth request ranging operation for uplink data transmission.

The mobile terminal (hereinafter referred to as a portable subscriber station (PSS)) transmits a bandwidth request code through the random access process. Subsequently, if a base station (BS) receives the bandwidth request ranging code without conflict, the BS allocates such a small uplink region to the PSS that a BR header can be transmitted through a CDMA_Allocation_IE message. When receiving the CDMA_Allocation_BE message, the PSS transmits to the BS a BR header message including a BR amount required for the region allocated by the BS. Next, when receiving the BR header message, the BS drives an uplink scheduler to allocate a bandwidth that is resource dedicated to an uplink data region to the PSS. As a result, the PSS can transmit data to the BS through the allocated bandwidth.

DISCLOSURE OF INVENTION

Technical Problem

Such a conventional orthogonal code transmission scheme using the random access channel has a higher data reception probability in a base station than does a direct data transmission scheme. However, in the orthogonal code transmission scheme, an additional process for requesting resources allocation for data transmission is needed, so there are problems of time delay in the data transmission and waste of radio resources due to resource request signaling.

The above information disclosed in this Background section is only for enhancement of understanding of the background of the invention and therefore it may contain information that does not form the prior art that is already known in this country to a person of ordinary skill in the art.

Technical Solution

The present invention has been made in an effort to provide a random access channel operating method in a mobile communication system having advantages of increasing use efficiency of a random access channel and preventing time delay in data transmission by measuring a load of the random access channel in a base station and dynamically changing a transmission format of a message according to the measured load level.

An exemplary embodiment of the present invention provides a random access channel operating method in a mobile communication system, including: (a) selecting a transmission mode according to a load of a random access channel and performing transmission to a mobile terminal; (b) receiving a message having a format corresponding to the selected transmission mode from the mobile terminal; (c) determining whether or not a preamble or data is included in the message received in (b) receiving of the message; and (d) if the data is determined to be included in (c) determining, transmitting a response message for data reception to the mobile terminal.

Another embodiment of the present invention provides a base station operating a random access channel in a mobile communication system, the base station including: a system load measuring module for measuring a load of a random access channel; a transmission mode selecting module for selecting a transmission mode of a mobile terminal according to a load level measured by the system load measuring module; a reception message determining module for determining a format of the received message if a message corresponding to the transmission mode is received from a mobile terminal; and a bandwidth allocation module for identifying a bandwidth request ranging code included in the preamble and allocating the bandwidth if the reception message determining module determines that a preamble is included in the received message.

Still another embodiment of the present invention provides a mobile terminal using a random access channel in a mobile communication system, the mobile terminal including: a transmission mode determining module for determining a transmission mode included in a message received from a base station, wherein the transmission mode is divided into three transmission modes according to a load level of a random access channel measured by the base station; a message generating module for generating a message according to a message format corresponding to the determined transmission mode; and a transmission band selecting module for selecting a bandwidth required to transmit data to the base station, wherein the transmission mode determined by the transmission mode determining module is a transmission mode corresponding to a high or medium level load.

A further embodiment of the present invention provides a method of transmitting data through a random access channel in a mobile communication system, the method including: (a) receiving a transmission mode from a base station; (b) generating a message of a format corresponding to the transmission mode received in (a) receiving the transmission mode; (c) transmitting the message generated in (b) generating the message to the base station and determining whether or not a bandwidth allocation message is transmitted from the base station; and (d) if the bandwidth allocation message is determined to be received in (c) determining, transmitting a message including data that is to be transmitted through a bandwidth allocated by the base station.

BRIEF DESCRIPTION OF THE DRAWINGS

FIG. 1 is a view illustrating a frame structure used in a mobile communication system.

FIG. 2 is a schematic view illustrating a PN code generator used in the mobile communication system.

FIG. 3 is a view illustrating a signaling procedure including a bandwidth request ranging operation for uplink data transmission.

FIG. 4 is a view illustrating a configuration of a base station and a mobile terminal according to an embodiment of the present invention.

FIG. 5 is a view illustrating a transmission mode that a base station selects according to an NI level of a random access channel measured by the base station according to an embodiment of the present invention.

FIGS. 7 and 8 are detailed views illustrating random access channel operating methods corresponding to TFIs according to an embodiment of the present invention.

BEST MODE FOR CARRYING OUT THE INVENTION

Figure 6:
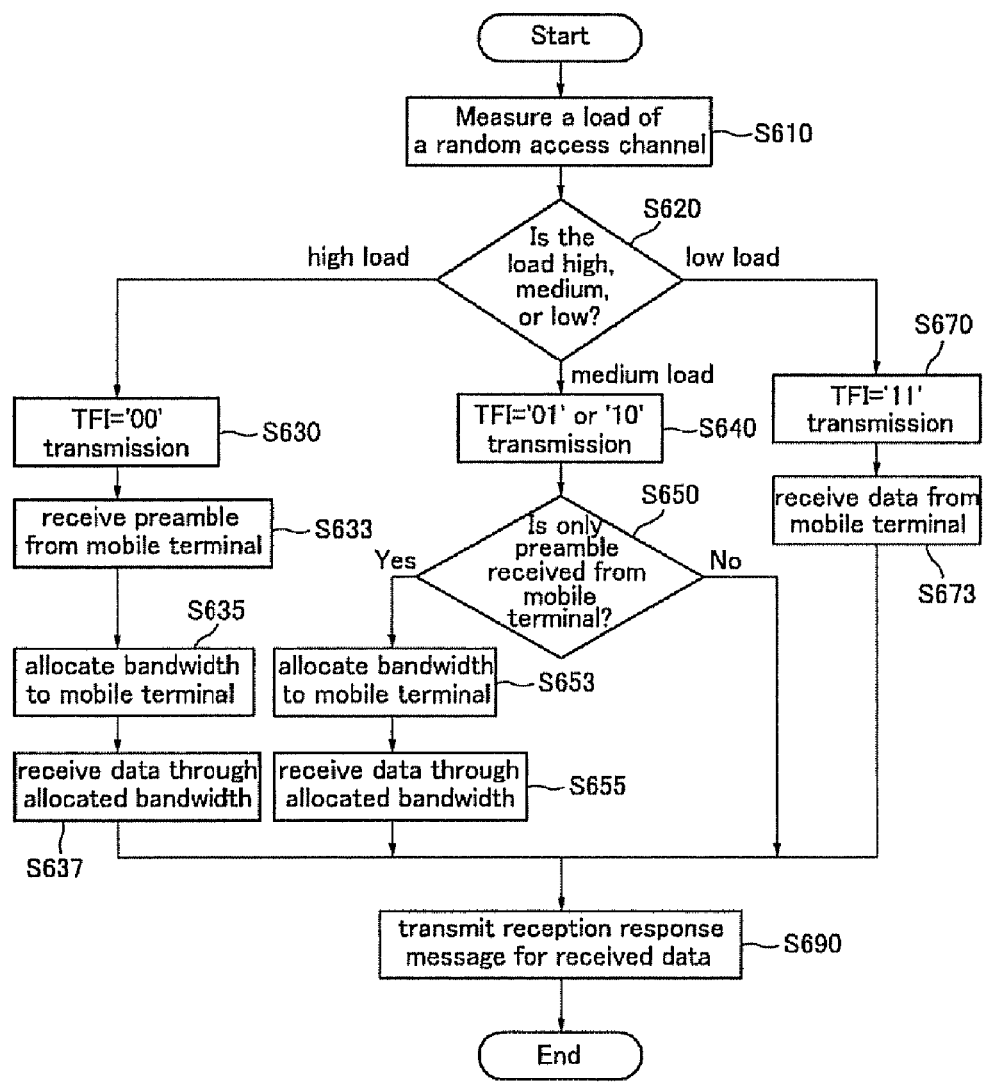
FIG. 6 is a flowchart illustrating a random access channel operating method in a mobile communication system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless otherwise defined, when a term includes is used to describe that a component has certain constituent elements, other constituent elements are not particularly limited, and thus one or more constituent elements may be further included.

In addition, a term "module" in the specification denotes a unit for performing a specific function or operation. The module may be implemented in a hardware manner, a software manner, or a combination thereof.

FIG. 4 is a view illustrating a configuration of a base station and a mobile terminal according to an embodiment of the present invention, and FIG. 5 is a view illustrating a transmission mode that a base station selects according to an NI level of a random access channel measured by the base station according to an embodiment of the present invention.

Referring to FIG. 4, the base station 410 according to the embodiment of the present invention includes a system load measuring module 411, a transmission mode selecting module 413, a reception message determining module 415, and a bandwidth allocation module 417.

The system load measuring module 411 is a module that measures a load or interference of the random access channel.

In the embodiment, as a method of measuring the load or interference, a noise and interference (NI) level measuring method may be used. The NI level measuring method is well-known to a person of ordinary skill in the art. Therefore, in the embodiment, detailed description thereof is omitted.

The NI is noise and interference occurring at the time that the base station 410 transmits data to a plurality of mobile terminals, and represents the noise and interference measured in units of dBm. According to the IEEE 892.16e standard, in a case where the measured NI level is quantized in units 0.5 dBm, the NI level can be represented by a value in a range of −150 dBm to −22.5 dBm.

The transmission mode selecting module 413 is a module that selects a plurality of transmission modes according to the NI level measured by the system load measuring module 411.

In the embodiment, the transmission mode selecting module 413 selects high, medium, and low loads according to the measured high, medium, and low NI levels, respectively.

In the embodiment, the NI level ranges used for dividing the transmission mode into three transmission modes are assumed to be set as follows. The NI level ranges are arbitrarily set for the convenience of description, but the present invention is not limited thereto. Therefore, the setting of the NI level ranges can be modified according to communication environments.

In the embodiment, it is assumed that the high, medium, and low loads are set to a case where the NI level is in a range of −52.5 dBm to −22.5 dBm, a case where the NI level is in a range of −19 dBm to −52.6 dBm, and a case where the NI level is in a range of −150 dBm to −120 dBm, respectively.

The transmission mode selecting module 413 selects a transmission format indication (TFI) corresponding to the measured NI level among the aforementioned three transmission modes.

The TFI can be transformed in units of frames. In addition, in an existing WiBro system, the TFI may be included as a field in a UL-MAP IE message or an uplink channel descriptor (UCD) message.

In addition, the TFI may be an identifier (field) identifying a transmission format of a message received from a mobile terminal 450 through the random access channel, as shown in FIG. 5.

Referring to FIG. 5, in the embodiment, a load having a high NI level is set to TFI='00', a load having a medium NI level is set to TFI='01' or '10', and a load having a low NI level is set to TFI='11'.

Here, the TFI='00' is an identifier that the base station 410 transmits to the mobile terminal 450 in order to receive a preamble from the mobile terminal 450 when the base station 410 measures a high load of the random access channel. In general, if the load of the random access channel is a high load, the base station 410 can receive data (generally having a large size) from the mobile terminal 450 at a low reception probability. Therefore, the base station 410 requests the mobile terminal 450 to transmit a preamble (generally having a relatively small size and a high reception probability).

Here, the data may have so small a size as to be transmitted through the random access channel, for example, as a short message service (SMS) message.

In addition, the TFI='01' or TFI='10' is an identifier that the base station 410 transmits to the mobile terminal 450 in order to receive the preamble and the data from the mobile terminal 450 when the base station 410 measurers a medium load of the random access channel. Since the load of the random access channel is a medium load, the base station 410 can receive the large-sized data as well as the small-sized preamble from the mobile terminal 450 at a high reception probability. Therefore, the base station 410 transmits the TFI='01' or the TFI='10' to the mobile terminal 450 and requests the mobile terminal 450 to transmit the preamble and the data.

In the embodiment, in the case of TFI='01', a message having a structure of 'preamble+data' is requested, and in the case of TFI='10', a message having a structure of 'data+preamble' is requested. However, the present invention is not limited thereto.

In addition, in the embodiment, both of the TFI='01' and the TFI='10' are used. However, for the convenience of use, the base station 410 may use either one of TFI='01' and TFI='10'. In this case, the mobile terminal 450 may arbitrarily select either one of the 'preamble+data' and 'data+preamble' structures and transmit the data to the base station 410. Since the mobile terminal 450 can perform arbitrarily transmission in either one of the 'preamble+data' and 'data+preamble' structures, the load of the random access channel can be distributed.

In addition, the TFI='11' is an identifier that the base station 410 transmits to the mobile terminal 450 when the base station 410 measures a medium load of the random access channel. Since the load of the random access channel measured by the base station 410 is a low load, the base station 410 can receive the large-sized data from the mobile terminal 450 at a high reception probability. Therefore, the base station 410 transmits the identifier TFI='11' to request the mobile terminal 450 to transmit the data.

The reception message determining module 415 is a module that determines a type of data received from the mobile terminal 450. More specifically, the reception message determining module 415 determines which one of the preamble and the data is included in the received message. If both of the preamble and the data are determined to be included in the message, the reception message determining module 415 may treat this case as a case where only the data is included in the message.

As a result of determination of the reception message determining module 415, if only the preamble is included in the message received from the mobile terminal 450, the bandwidth allocation module 417 identifies the bandwidth request ranging code included in the preamble to allocate the bandwidth requested by the mobile terminal 450.

Now, a configuration of the mobile terminal according to an embodiment of the present invention is described.

Referring to FIG. 4, the mobile terminal 450 according to the embodiment includes a transmission mode determining module 451, a message generating module 453, and a transmission band selecting module 456.

The transmission mode determining module 451 is a module that determines the transmission mode received from the base station 410. More specifically, the transmission mode determining module 451 determines which one of the TFIs '00', '01', '10', and '11' is included in the transmitted transmission mode.

The message generating module 453 is a module which generates a message that is to be transmitted to the base station 410 according to a value of the TFI determined by the transmission mode determining module 451.

The message generating module 453 according to the embodiment generates a message including the preamble having a bandwidth request ranging code so as to transmit the data when the value of TFI is '00'. Here, the bandwidth request ranging code is included in the preamble.

In addition, the message generating module 453 generates a message including the preamble and the data when the value of TFI is '01' or '10'.

In addition, the message generating module 453 generates the to-be-transmitted data when the value of TFI is '11'.

The transmission band selecting module 456 selects a bandwidth required to transmit the message to the base station 410 when the value of TFI determined by the transmission mode determining module 451 is any one of '00', '01', and '10'. In addition, the transmission band selecting module 456 provides the bandwidth request ranging code, that is, information on the selected bandwidth, to the message generating module 453.

FIG. 6 is a flowchart illustrating a random access channel operating method in a mobile communication system according to an embodiment of the present invention. FIGS. 7 and 8 are detailed views illustrating random access channel operating methods corresponding to TFIs according to an embodiment of the present invention. As shown in FIG. 6, a system load measuring module 411 measures a load of a random access channel (S610).

Subsequently, a transmission mode selecting module 413 selects a transmission mode based on a result of measurement of the system load measuring module 411 (S620).

In the operation S620, if the load of the system is determined to be a high load (see (a) of FIG. 7), the transmission mode selecting module 413 selects TFI='00', and a base station 410 transmits the TFI='00' to a mobile terminal 450 (S630). Next, the base station 410 receives a message including a preamble from the mobile terminal 450 (S633). A bandwidth allocation module 417 identifies a bandwidth request ranging code included in the preamble and allocates the bandwidth to the mobile terminal 450 (S635). At this time, the base station 410 transmits a CDMA_Allocation_IE message to the mobile terminal 450 in order to allocate the bandwidth. Here, the CDMA_Allocation_IE message is a message including uplink bandwidth information requested by the mobile terminal 410. When receiving the message, the base station 410 allocates such a bandwidth that an arbitrary mobile terminal can transmit small-sized data through uplink by using only code information (not terminal information).

Subsequently, the base station 410 receives a message including the data from the mobile terminal 450 through the allocated bandwidth (S637). The base station 410 transmits a reception response message to the mobile terminal 450 indicating that the message is normally received (S690).

In addition, if the load of the system is determined to be a medium load in the operation S620 (see (c-2) of FIG. 8), the transmission mode selecting module 413 selects TFI='01' or TFI='10, and the base station 410 transmits the TFI='01' or the TFI='10' to the mobile terminal 450 (S640). Next, the base station 410 receives a message from the mobile terminal 450, and the reception message determining module 415 determines whether or not only the preamble is included in the received message (S650).

In the operation S650, if only the preamble is determined to be received, the bandwidth allocation module 417 identifies the bandwidth request ranging code included in the preamble and allocates the bandwidth to the mobile terminal 450 (S653). At this time, the base station 410 transmits the CDMA_Allocation_IE message to the mobile terminal 450 in order to allocate the bandwidth.

Subsequently, the base station 410 receives a message including the data from the mobile terminal 450 through the allocated bandwidth (S655). The base station 410 transmits the reception response message to the mobile terminal 450 indicating that the data is normally received (S690).

In addition, if the data as well as the preamble are determined to be received in the operation S650 (see (c-1) of FIG. 8), the base station 410 transmits the reception response message to the mobile terminal 450 indicating that the data is normally received (S690).

In addition, if the load of the system is determined to be a low load in the operation S620, the transmission mode selecting module 413 selects TFI='11', and the base station 410 transmits the TFI='11' to the mobile terminal 450 (S670). Next, the base station 410 receives a message including the data from the mobile terminal 450 (S673). The base station 410 transmits the reception response message that the data is normally received to the mobile terminal 450 (S690).

In other words, in only the two cases, that is, a case where the load of the system is determined to be a high load in the operation S620 and a case where the load of the system is determined to be a medium load in the operation S620 and only the preamble is determined to be received in the operation S659, the operation in which the base station 410 allocates the bandwidth to the mobile terminal 450 is performed.

In addition, in a case where the load of the system is determined to be a low load in the operation S620 and in a case where the load of the system is determined to be a medium load in the operation S650 and the data as well as the preamble are determined to be received in the operation S650, the operation of allocation the bandwidth through the preamble transmission between the base station 410 and the mobile terminal 450 can be omitted.

The aforementioned exemplary embodiments of the present invention are described to be implemented in only the wireless communication network. However, through a slight modification thereof, the embodiments may be implemented in a wire communication network.

Exemplary embodiments of the present invention can be implemented not only through the aforementioned method and apparatus but also through computer programs executing functions in association with the structures of the exemplary embodiments of the present invention or through a computer readable recording medium having embodied thereon the computer programs. The present invention can be easily implemented by those skilled in the art by using the above descriptions according to the exemplary embodiments.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

According to the present invention, use efficiency of a random access channel can be increased by measuring a system load of the random access channel in a base station and changing a transmission format of a burst transmitted through the random access channel according to the measured load level.

In addition, according to the present invention, since a mobile terminal can transmits small-sized data such as an SMS message without a process of allocating a separate bandwidth, time required for data transmission can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A random access channel operating method in a mobile communication system, comprising:
   (a) selecting a transmission mode according to a load of a random access channel and performing transmission to a mobile terminal;
   (b) receiving a message having a format corresponding to the selected transmission mode from the mobile terminal;
   (c) determining whether or not a preamble or data is included in the message received in (b) receiving of the message; and
   (d) if the data is determined to be included in the (c) determining, transmitting a response message for data reception to the mobile terminal.

2. The random access channel operating method of claim 1, wherein, in (a) selecting of the transmission mode, measurement of the load of the random access channel is performed based on measurement of a noise and interference (NI) level.

3. The random access channel operating method of claim 2, wherein the transmission mode is divided into three transmission modes, including:
   a transmission mode corresponding to a first level in a highest-level range among NI level ranges;
   a transmission mode corresponding to a second level in a lowest-level range among NI level ranges; and
   a transmission mode corresponding to a third level in a range excluding the first and second levels among the NI level ranges.

4. The random access channel operating method of claim 3, wherein each transmission mode is allocated with a transmission format indication (TFI) corresponding to each NI level range.

5. The random access channel operating method of claim 1, wherein the preamble includes a bandwidth request ranging code that includes information on a bandwidth that is required to transmit the data by the mobile terminal.

6. The random access channel operating method of claim 5, further comprising:
   allocating a bandwidth corresponding to the bandwidth request ranging code included in the preamble if only the preamble is determined to be included in the (c) determining, and
   transmitting a reception response message for the received data if a message including the data is received from the mobile terminal.

7. A base station operating a random access channel in a mobile communication system, the base station comprising:
   a system load measuring module for measuring a load of a random access channel;
   a transmission mode selecting module for selecting a transmission mode of a mobile terminal according to a load level measured by the system load measuring module;
   a reception message determining module for determining a format of the received message if a message corresponding to the transmission mode is received from a mobile terminal; and a bandwidth allocation module for identifying a bandwidth request ranging code included in the preamble and allocating the bandwidth if the reception message determining module determines that a preamble is included in the received message.

8. The base station of claim 7, wherein the system load measuring module measures the load of the random access channel based on measurement of a noise and interference (NI) level.

9. The base station of claim 8, wherein the transmission mode selecting module is divided into three transmission modes according to the NI level measured by the system load measuring module, and each transmission mode is allocated with a transmission format indication (TFI) corresponding to each NI level range.

10. The base station of claim 9,
wherein the base station receives a preamble including the bandwidth request ranging code from the mobile terminal that receives the TFI allocated to the transmission mode corresponding to a low NI level,
wherein the base station receives the preamble and data that the mobile terminal is to transmit from the mobile terminal that receives the TFI allocated to the transmission mode corresponding to a medium NI level, and
wherein the base station receives the data that the mobile terminal is to transmit from the mobile terminal that receives the TFI allocated to the transmission mode corresponding to a low NI level.

11. A mobile terminal using a random access channel in a mobile communication system, the mobile terminal comprising:
a transmission mode determining module for determining a transmission mode included in a message received from a base station, wherein the transmission mode is divided into three transmission modes according to a load level of a random access channel measured by the base station;
a message generating module for generating a message according to a message format corresponding to the determined transmission mode; and
a transmission band selecting module for selecting a bandwidth required to transmit a data to the base station,
wherein the transmission mode determined by the transmission mode determining module is a transmission mode corresponding to a high or medium level load.

12. The mobile terminal of claim 11,
wherein the message generating module generates a message including a preamble having a bandwidth request ranging code corresponding to a bandwidth selected by the transmission band selecting module if the determined transmission mode is a transmission mode corresponding to a high level load,
wherein the message generating module generates a message including the preamble and to-be-transmitted data if the determined transmission mode is a transmission mode corresponding to a medium level load, and
wherein the message generating module generates a message including the to-be-transmitted data if the determined transmission mode is a transmission mode corresponding to a low level load.

13. A method of transmitting data through a random access channel in a mobile communication system, the method comprising:
(a) receiving a transmission mode from a base station;
(b) generating a message of a format corresponding to the transmission mode received in (a) receiving of the transmission mode;
(c) transmitting the message generated in (b) generating of the message to the base station and determining whether or not a bandwidth allocation message is transmitted from the base station; and
(d) if the bandwidth allocation message is determined to be received in the (c) determining, transmitting a message including data that is to be transmitted through a bandwidth allocated by the base station.

14. The method of claim 13,
wherein the transmission mode is divided into three transmission modes according to load ranges of a random access channel measured by the base station,
wherein (b) generating of the message comprises:
generating a message including a preamble having a bandwidth request ranging code corresponding to a bandwidth required to transmit data if a transmission mode corresponding to a high load range is received;
generating a message including the preamble and to-be-transmitted data if a transmission mode corresponding to a medium load range is received; and
generating a message including the to-be-transmitted data if a transmission mode corresponding to a low load range is received.

* * * * *